July 13, 1926.
W. IFF
1,591,979
METHOD AND APPARATUS FOR PREPARING CHOCOLATE
Filed Nov. 10, 1924   2 Sheets-Sheet 2
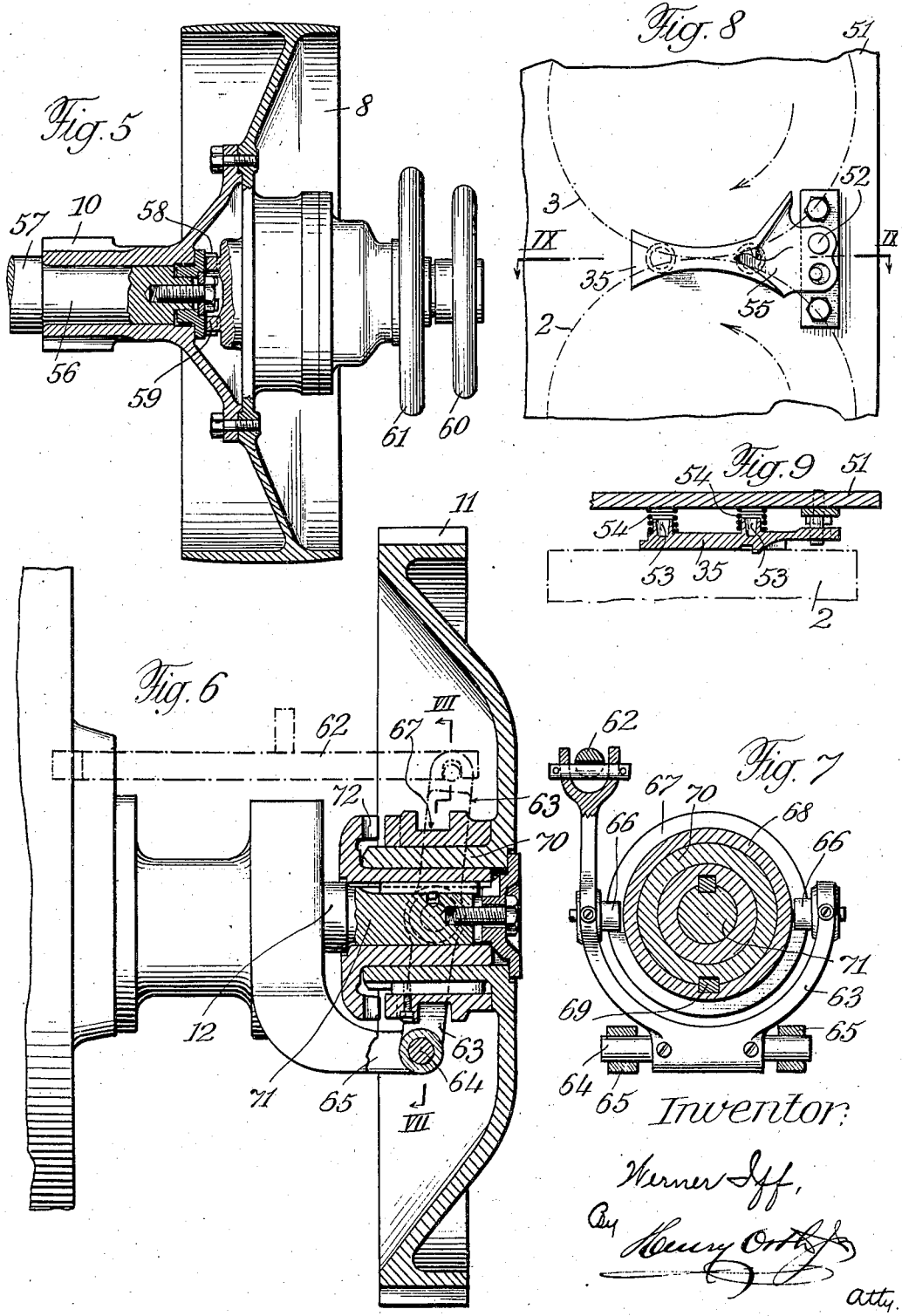

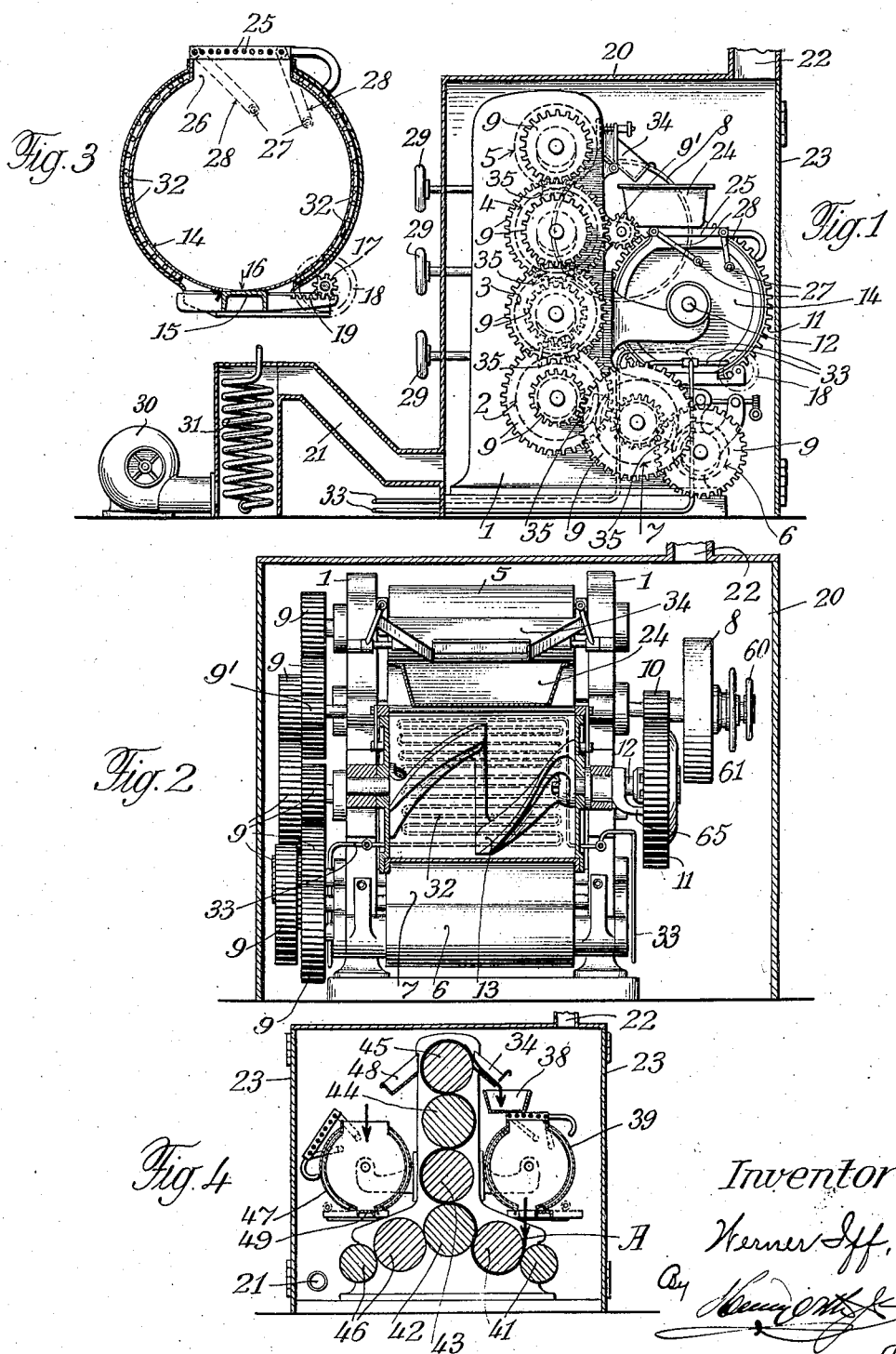

Patented July 13, 1926.

1,591,979

UNITED STATES PATENT OFFICE.

WERNER IFF, OF FLAWIL, SWITZERLAND, ASSIGNOR TO THE FIRM GEBRÜDER BÜHLER, OF UZWIL, SWITZERLAND.

METHOD AND APPARATUS FOR PREPARING CHOCOLATE.

Application filed November 10, 1924, Serial No. 749,096, and in Switzerland August 22, 1924.

The hitherto known method of preparing a chocolate mass or dough is, for instance, carried out in the following manner:

Ground cocoa and sugar are worked to a dough in a mixing machine, and the mass of dough is in batches fed to a rolling mill in which the dough is finely ground or rubbed to a smooth mass. This smooth and more or less dry mass is then placed in moulds in a heating chest. By the influence of the heat the cocoa butter which has become dry during the grinding process melts; this heating process lasts from two to three days. The stoved chocolate mass is then put into the so-called conch for becoming completely soft and eventually for being caramelized. It will thus be seen that a plurality of machines are utilized for preparing chocolate, which machines have their shortcomings and which cause a discontinuity of the working process. A further drawback is the intermittent treatment and the necessary removal of the dough which adheres very tightly to the walls owing to its sticky nature. Losses through the idle running in the production and in driving power of up to 30% are unavoidable with the present method.

A further well known drawback inherent to the so-called melangeur or ramolliseuse (a kind of chat-roller), is the fact that it can only be heated with difficulty and that the dough is not positively guided so that the particles of the dough are not uniformly acted upon, so that a nonuniform product results and further that the distance between the roller and the bottom of the melangeur with which the roller cooperates cannot be readily adjusted for any desired consistency of the dough.

The conches work the dough thoroughly only after a comparatively high percentage of butter has been added and after every trace of moisture has been removed from the dough; the dough adheres to the walls and corners of the conches and is apt to be overheated or burnt if the conches are not frequently cleaned.

The subject matter of the present invention is a method of preparing chocolate according to a novel principle, in which the method is carried out in a single machine, during a single uninterrupted operation, independent of the attendance of the quality and the composition of the ingredients used for forming the dough and requires only a fraction of the time hitherto used. In carrying out the method a product is obtained of a far superior quality to that obtainable hitherto, and which requires less addition of butter, less power, less attendance to be prepared. Proposals have been made to combine some of the single machines hitherto used, however they yield only inferior products.

The method according to the present invention consists in circulating continuously a stream of hot air through an enclosed rolling mill provided with a trough for mixing and kneading the material.

The constant renewal of the hot air is of essential importance for the quality of the product. Furthermore the present method enables one to mix simultaneously cocoa, sugar and all the other ingredients used in the manufacture of chocolate in one cycle of any desired duration and to grind finely, stove and "conch" the materials.

With the present method the action of the hot air is already present at the beginning of preparing the chocolate dough, i. e., when cocoa and sugar are mixed and is continued without any interruptions during the rolling, stoving and conching process.

Preferably the trough for mixing and kneading is in the same enclosed chamber as the rolling mill and a circulation of the hot air is effected within said chamber.

In carrying out the method according to the present invention the dough is positively supplied to the rubbing or grinding elements during the whole treatment and passes these elements in such a manner that from the start to the end a completely uniform treatment is effected.

Two constructional examples of devices adapted to carry out the method according to the invention are illustrated on the accompanying drawings, in which:

Fig. 1 is a side elevation with parts shown in section of a first constructional example, Fig. 2 is a front elevation with parts shown in section, Fig. 3 is a vertical section through a detail, Fig. 4 shows in a diagrammatic manner a vertical section through a second constructional example, Fig. 5 shows a first detail of Fig. 2 in a side view and partly in an axial section, Fig. 6 shows a further detail of Fig. 2 in a side view and partly in axial section, Fig. 7 is a section along line VII—VII of Fig. 6, Fig. 8 is a detail of Fig. 1 in a side view and Fig. 9 is a section along line IX—IX of Fig. 8.

Referring now to the constructional example illustrated in Figs. 1 and 2, 1 denotes a rolling mill provided with four rollers, 2, 3, 4 and 5 arranged one above the other and a pair of feed rollers 6, 7, the roller 7 transmitting the material to the roller 2. The rollers are driven from a belt pulley 8 by a number of gear wheels 9. A pinion 10, arranged on the shaft on which the pulley 8 is mounted, is in mesh with a gear wheel 11 on a shaft 12; upon the latter the mixing and kneading blades 13 are mounted which rotate within the trough 14. The latter (Fig. 3) is provided at its bottom with an outlet opening 16 closable by a gate 15. The gate 15 is displaceable by means of a rack 19 engaging with a pinion 17 which can be turned by a hand wheel 18 in order to adjust the outlet opening of the trough 14. The rolling mill 1 and the trough 14 are arranged within an enclosed chamber 20, to which fresh hot air is supplied in its lower part by the conduit 21, the used hot air is discharged in the upper part of the chamber by the conduit 22. A door 23 provides for access to the chamber 14 for charging the trough 14 with the material to be treated and for removing the finished product, which is discharged into the basin 24. The latter is supported by a grate 25 situated above the opening 26 through which the trough 14 is charged; the grate 25 may be swung around the pivot pins 27 by means of levers 28. When the grate 25 is swung from the position indicated in Fig. 3 towards the right the opening 26 of the trough is uncovered, the trough can be charged with cocoa and sugar.

The outlet opening 16 of the trough is above the nip of the rollers 6 and 7. The hand wheel 18 is arranged outside of the chamber 20 as well as the hand wheels 29 by means of which the rollers 3, 4 and 5 are adjusted in a manner well known in the art.

The hot fresh air is blown through the chamber 20 by the blower 30, a steam coil 31 serves for heating the air discharged by the blower. Instead of the steam coil other suitable means may be provided for heating the air. The air is heated to such a temperature as is common practice in stoving and conching. Although the hot air will enter the interior of the trough 14 and will influence the contents of the latter, I prefer to provide a steam jacket, by means of heating coils 32, around the trough 14. The pipes 33 (Fig. 1) serve for the supply and the discharge of the steam to the heating coils 32.

The chocolate mass on the roller 5 is removed by a scraping device 34 leading the mass into the basin 24. The opening 16 feeds the material over the whole width of the rollers 6 and 7 and all the rollers 2, 3, 4 and 5 are covered over their whole width by the doughy mass. To prevent the material from being squirted out laterally of the rollers and to prevent the formation of places where the mass may be deposited and overheated lateral guides are provided at the end of the cooperating rollers. These guides are shown in detail in Figs. 8 and 9. The guides 35 are swingably mounted about a pin 52 fixed to the inner side of the lateral frame shields 51 of the rolling mill 1. Each guide 35 is provided with two bosses 53 on the remote side as regards the rollers. A helical compression spring 54 is arranged around each boss 53 and abuts against the shield 51 and causes the guide plate 35 to be pressed against the ends of a pair of rollers. The guide 35 is provided with a facing 55 which is so shaped that doughy mass which tends to escape laterally of the roller 2 is conducted back to that roller in order to be introduced in between the rollers 2 and 3.

Fig. 5 shows a device by means of which the rolling mill may be cut out without cutting out the drive of the mixing blades, the latter being driven by the pinion 10 cooperating with the gear wheel 11. The pinion 10 and the belt pulley 8 are rotatable on the journal 56 of a shaft 57, to the other end of which a pinion 9' (Fig. 1) is fixed. To the end of the journal 56 the one half 58 of a claw clutch 58, 59 is fixed. The other half 59 of the claw clutch is axially displaceable by turning the hand wheel 60 so that the two clutch halves can be brought in and out of engagement with each other as desired. A hand wheel 61 serves for locking the clutch in its operative and inoperative positions.

In Figs. 6 and 7 an arrangement is illustrated by means of which the mixing blades can be rotated or stopped by actuating a lever 62. The latter is operatively connected to a forked lever 63 turnable about an axle 64, which is journalled in two arms 65 carried by or integral with the bearing for the shaft 12. The forked lever 63 is provided with two pins 66 projecting into an annular groove 67, the latter being provided on a bush 68 which is axially displaceable on the boss 70 of the gear wheel 11, but is prevented from rotating relatively to the boss 70 by the feather 69. To the end 71 of the axle 12 the one half 72 of a clutch is keyed and the other half of the clutch is formed by the bush 68. When the clutch 68, 72 is thrown in by means of the lever 62 the gear wheel 11 drives the axle 12. In Fig. 6 the axle 12 is at a standstill as the clutch is out of engagement.

The rollers 2, 3, 4 and 5 run at different circumferential speeds, so that one roller leads with respect to another and this difference in speed suffices to maintain the grease contained in the dough in a liquid state owing to internal molecular friction thereby produced.

The method according to the invention may also be carried out by an installation as illustrated in Fig. 4, in which in a chamber 20, having a supply conduit 21 and a discharge conduit 22 for hot air, a rolling mill 40 is provided which differs from that illustrated in Fig. 1 inasmuch as a pair of feed rollers 41 is provided to the left as well as to the right of the rollers 42, 43, 44 and 45 of the rolling mill. A mixing and kneading trough 47 is provided above the pair of supply rollers to the left as well as to the right of the rolling mill, and a scraper 48 for removing the mass from the roller 35 is provided and adapted to cooperate with a basin placed upon the left hand trough 47 besides the scraper 34 which cooperates with the basin 38. This symmetrical arrangement permits a continuous working inasmuch as the trough 47 may be charged with material to be treated while the material treated in the trough 39 is discharged to the pair of supply rollers 41 as is indicated by the arrow shown in Fig. 4. A thick line shows the patch of the material from the trough 39 to the basin 38. When the trough 39 is empty the movements of the rollers 42, 43, 44 and 45 are reversed, the blades in the trough 39 are stopped and the blades in the trough 47 are rendered operative. When the mixing action in the trough has lasted long enough the gate 49 controlling the outlet opening of this trough is withdrawn and the material to be treated is fed to the pair of rollers 46. In this manner a continuous working without interruption or idle running is rendered possible.

Also with this constructional example of the device for carrying out the method according to the present invention the action of the hot air starts from the beginning of making the chocolate dough, i. e., when cocoa and sugar are mixed, and lasts without any interruption during the grinding, stoving and conching process. During the whole working process the dough is finely and uniformly ground or rubbed. This is necessary in the manufacture of chocolate and is a condition to which the hitherto known machines do not respond. The continuous action of the hot fresh air, i. e., the bathing of all the parts of machinery during the whole working process is of vital importance. The mass leaving the scraping devices may be fed anew to the pair of rollers 41 or 46 so that it passes once more through the rolling mill.

Other combinations of the rollers and mixing device than those illustrated may be arranged for carrying out the process according to the present invention, provided the action of the temperature required for obtaining the desired product is made use of.

The advantages resulting from the enclosing of the machinery and from the action of the hot fresh air are substantially the following:

The moisture contained in the dough is expelled more completely and quicker than with the hitherto known methods as the mixing trough is heated and the latter and the rolling mill are continuously flooded by a stream of dry air.

The access of damp air or contaminated air to the chocolate mass during its preparation is excluded, as the machine works in a totally enclosed chamber.

During the whole working process the dough is thoroughly and uniformly kneaded, mixed, rubbed and aired at an elevated temperature.

The dough is forced to pass repeatedly the rubbing elements during the manufacture, the total doughy mass has to pass between the rollers, a lateral escape is rendered impossible. All the material in the kneading and mixing trough has to pass through the rolling mill.

Any idle running of the rolling mill owing to an imperfect supply of dough and the thereby resulting loss in production and driving power is avoided. In the constructional example according to Figs. 1 and 2 the rolling mill is stopped during the mixing and kneading of the material and is only operative after the mixing is finished and until after all the mass from the mixing trough has been treated.

The thickness of the layer of dough to be treated may be adjusted irrespective of the consistency of this pasty mass.

An essential feature of the method consists in the fact that the conching effect begins with the start of the operation and that it occurs with the same intensity from the beginning to the end of the operation in contradistinction to the known longitudinal rubbing machine in which the effective action depends on the percentage of moisture in the doughy mass. The whole charge of dough is uniformly rubbed or conched without the interference of an attendant. A burning or overheating of the dough during the rubbing is excluded. Any consistency of the dough which might impair the beginning of the conching action can be avoided.

The process according to the invention may for instance be so carried out that dry ground cocoa and ground sugar are mixed and maintained at a temperature within the chamber of approximately 70–80° centigrade. Thereupon the material from the mixing trough is fed to the rolling mill in which it is finely rubbed and ground during one passage through the mill.

Ground cocoa may also be mixed with unground crystalline sugar and the charge in the mixing trough may pass once through the rolling mill in order to be preliminarily ground and rubbed, the ultimate fine rubbing and grinding action occurring then during a second passage of the mass through the rolling mill.

Ground chocolate dough prepared according to the known process may be filled into the mixing and kneading trough, wherein it is exposed to the hot air during a suitable period and is then passed through the rolling mill, with the rollers adjusted to press the material only slightly and for such a period until the desired consistency and quality of the dough are obtained. The temperature during this treatment is maintained at 70° centigrade. Also in this case the advantages of practically no attendance and saving in butter is obtained.

Further ground cocoa and ground or unground sugar may be mixed to a dough in one mixing trough of a machine having two troughs and it may then be caused to pass through the rolling mill, the rollers of which are adjusted to press the material only slightly, into the other trough and vice versa from the latter through the rolling mill into the first trough and so on until the desired quality and consistency of the dough is reached, which action generally takes up one third or one fourth of the time used when working according to the known method, and presenting at the same time the advantages of saving butter, space required and attendance.

I claim:

1. An installation for preparing chocolate, comprising a rolling mill for treating the ingredients, at least one mixing and kneading trough operatively connected to said rolling mill, a casing totally enclosing said roller mill and said troughs and means for supplying hot fresh air to said casing and for discharging the used air from the latter.

2. The art of preparing chocolate, which comprises mixing the chocolate ingredients, grinding the mixture and effecting caramelization, all of said operations being effected in a current of hot air.

3. The art of preparing chocolate, which comprises mixing the chocolate ingredients, grinding the mixture and effecting caramelization, all of said operations being effected in a current of hot air of a temperature between 70° and 80° C.

4. The art of preparing chocolate, which comprises mixing the chocolate ingredients, grinding the mixture and effecting caramelization, all of said operations being effected in a closed chamber in a current of hot air passing through said chamber, and locally applying heat to the mixture during the mixing stage.

In testimony whereof I affix my signature.

WERNER IFF.